INVENTOR.
SAMUEL BEITLER
BY
ATTORNEY

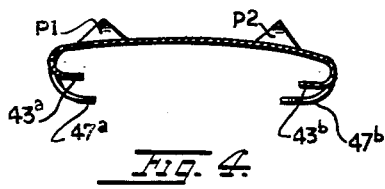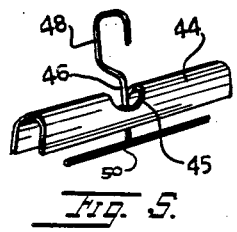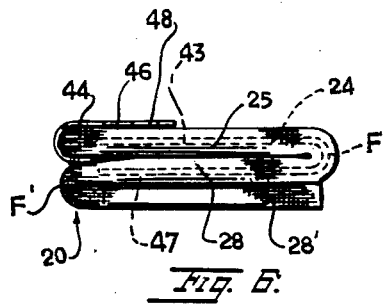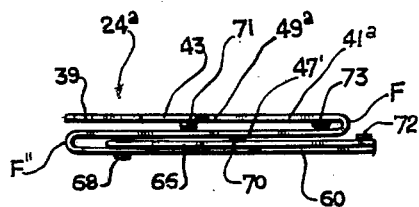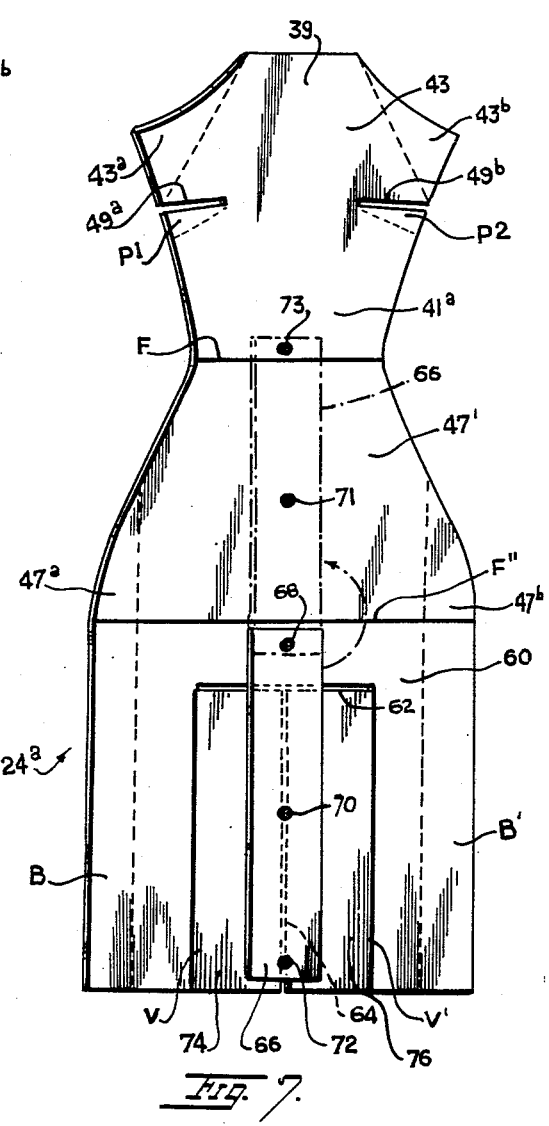

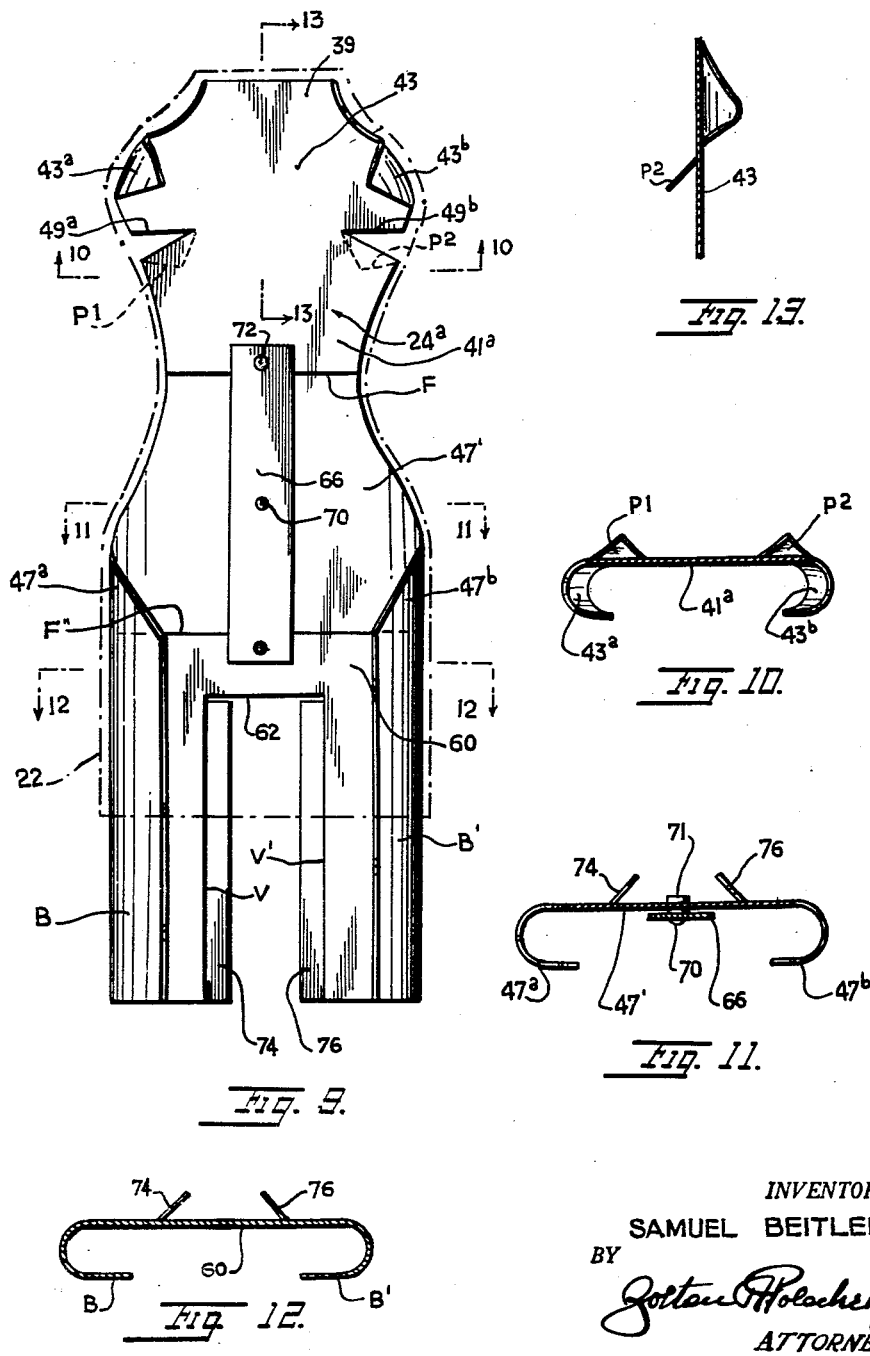

3,149,424
Patented Sept. 22, 1964

3,149,424
DISPLAY FORM FOR CUT-UP YARD GOODS FOR GARMENTS
Samuel Beitler, 35 Sutton Place, New York, N.Y.
Filed Aug. 16, 1962, Ser. No. 217,494
5 Claims. (Cl. 35—56)

This invention concerns a display package for yard goods.

The invention is intended to fulfill a long felt need of yard goods salesmen, retailers, wholesalers, manufacturers and others for a suitable, easily transportable, compact, inexpensive, lightweight form for displaying yard goods in such fashion as to simulate a garment in appearance.

While it has been known heretofore that fabrics can be draped upon a three-dimensional form to simulate a garment as it would appear if made up from the uncut and unsewn fabric, such a draped form is inconvenient to store, carry and ship. When a plurality of such forms are required for display of different fabrics, the forms are too bulky and occupy too much space to be of practical value for the purpose intended.

The present invention has as a principal object to provide a display package which can be folded to flat form and can be opened to display in three-dimensional form, a draped piece of uncut and unsewn fabric.

A further object is to provide a novel flexible display form simulating a human torso and suitable for draping fabric thereon.

Another object is to provide a novel display form as described, wherein the form is foldable to flat compact size and wherein the form is provided with means for support in an upright non-collapsible position.

Still another object is to provide a novel flexible display form for draping yard goods thereon, wherein the form is flat and foldable to compact size and wherein the form is provided with means rendering it self-supporting as a three-dimensional figure simulating a human torso.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a sectional view taken on line 4—4 of FIG. 3.

FIG. 5 is a perspective view of a hanger assembly for the package.

FIG. 6 is a side view of the package of FIGS. 1 and 2 in folded form.

FIG. 7 is a rear view of another display form in flat unfolded position, embodying the invention.

FIG. 8 is an edgewise view of the form of FIG. 7 in folded position.

FIG. 9 is a rear view of the form of FIG. 7 in upright, self-supporting position and shaped three-dimensionally to simulate a human torso.

FIGS. 10, 11, 12 and 13 are sectional views taken on lines 10—10, 11—11, 12—12 and 13—13, respectively, of FIG. 9.

Figure 1:
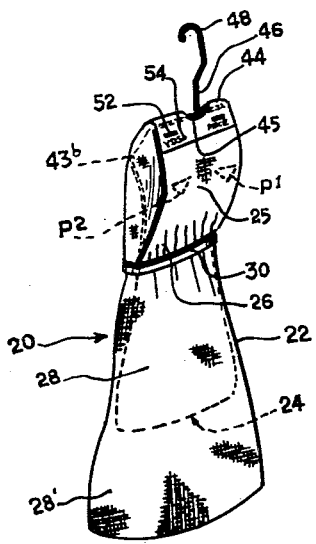
FIG. 1 is a perspective front and side view of a display package embodying the invention.
Figure 2:
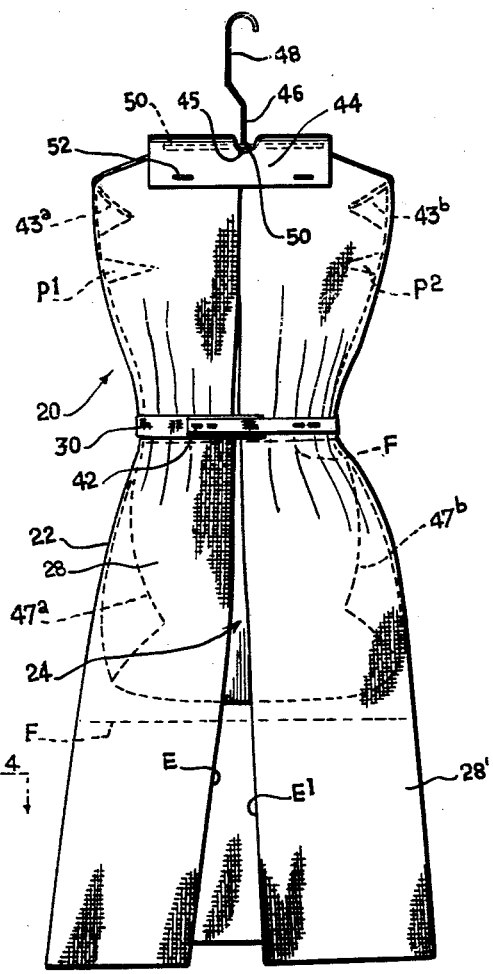
FIG. 2 is a rear elevational view of the display package, on an enlarged scale.

In FIGS. 1 and 2 is shown a display package 20 in which a suitable length of uncut and unsewn fabric or yard goods 22 is draped upon an internal display form 24. The fabric is draped to simulate a dress at the front with a bosom portion 25, waist portion 26 and skirt portion 28. A narrow strip of fabric 30 simulates a belt for the dress. The rear of the package as shown in FIG. 2 is arranged so that a long opening is provided from top to bottom of the package, between adjacent long edges E, E' of the fabric. Through this opening access is had to the display form 24 inside the fabric enclosure.

Figure 3:
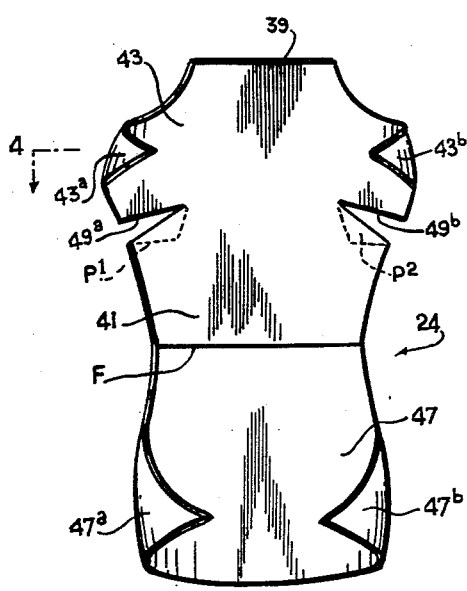
FIG. 3 is a rear view of the display form employed in the package of FIGS. 1 and 2.

The belt 30 has its ends secured together at the back of the package by staples 42. A strip of cardboard or paper 44 is folded over the upper edge of the package. This strip as shown in FIGS. 1–3 has an upper hole 45 through which extends the shank 46 of a hanger 48. The hanger has a crossbar 50 which engages rotatably under the bight of the folded strip 44. The strip is secured to the top edge of the package by staples 52 and may have pricing and other data 54 marked thereon.

The display form 24 is made from a flat sheet of cardboard or other light, flexible sheet material. The form simulates a human torso in outline as best shown in FIGS. 3 and 4. It has a narrow waist portion 41, neck 39, wide shoulder portion 43 and wide abdominal portion 47. Upper corner portions 43ª, 43ᵇ can be bent and cured rearwardly to simulate shoulders of the torso. Slits 49ª, 49ᵇ are formed angularly in the sheet and define flaps or tabs which can be folded forwardly to form triangular projections P1, P2 which simulate breasts. Lower corner portions 47ª, 47ᵇ can be bent and folded rearwardly to simulate rounded hips of the torso; see FIGS. 3 and 4.

This bending and forming of the sheet parts can all be done by manually reaching into the package between edges E, E'. Then when the package is suspended by hanger 48, the dress defined by the fabric 22 is supported on a three-dimensional display form. The package provides a very effective display of the fabric as it might appear when tailored into a garment.

After use as a display, the bent and curved parts of the display form can be flattened out and the package can be folded compactly as shown in FIG. 6. Only a single fold of the display form along line F across the waist 41 will be required in the folded package. The bottom 28' of skirt 28 of the dress extends below the display form and can be folded at F' under the upper part of skirt 28. The bosom part 25 will overlay skirt 28.

FIGS. 7–13 illustrate a display form 24ª which may be used for a self-supporting display package in an upright position. The form 24ª is shown in flat unfolded position in FIG. 7. It is similar in structure to form 24 and corresponding parts are identically numbered. The cardboard sheet form 24ª has a rectangular bottom part 60 provided with a T-slit including a transverse slit portion 62 and longitudinal slit portion 64. A stiff strip 66 is pivotally secured by an eyelet 68 to the upper end of extension 60 near fold line F". Two snap fastener elements 70, 72 are provided on the strip and can be engaged with mating fastener elements 71, 73 respectively on the central or abdominal form portion 47' and the waist portion 41ᵃ near fold line F.

FIG. 8 shows the form 24ᵃ folded flat for convenient shipment and storage. The strip 66 overlays bottom part 60 which is folded up under abdominal portion 47ᵃ. Portion 47' underlays the waist portion 41ᵃ, shoulder portion 43, and neck 39.

FIGS. 9–13 show the form 24ᵃ having parts bent and folded to three-dimensional configuration as described for form 24. In addition, strip 66 is turned up and secured across fold lines F, F'' by engagement of fastener elements 70, 72 with elements 71, 73, respectively. The edges B' and B'' of the bottom portion 60 are continuous with corners 47ᵃ and 47ᵇ. These edges are folded and bent rearwardly to partially cylindrical shape. Rectangular flaps 74, 76 are bent forwardly at vertical fold lines V and V' and serve as braces to hold the form 40ᵃ erect. The flaps 74 supplement the partially cylindrical supports defined by curved edges B and B' at opposite edges of the form. A suitable length of yard goods 22 indicated by dotted lines in FIG. 9 can be draped on the form to simulate a dress in the same manner as illustrated in FIGS. 1–3. The draped fabric will provide a showing of a garment on a three-dimensional figure which constitutes a very effective display. After use the bent and curved form can be restored to flatness while the fabric 22 is still on the form, and then the package can be folded in three overlapping sections somewhat like that of package 20 in FIG. 6.

Since the display packages fold compactly they can be stored in a very small space. They are very light in weight and a large number of display packages can be stored in a salesman's sample case. The displays can be quickly set up and taken down. They speed displaying and selling of fabrics at retail and wholesale. The forms are inexpensive and can be discarded when worn out. Fabrics can be quickly draped on the forms and replaced at will.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A display form for a fabric display package, comprising a flat flexible sheet having a peripheral edge shaped to simulate the outline of a human torso, said sheet having shoulder, waist and abdominal portions, said shoulder portion being formed with corners which can be bent and curved rearwardly of the plane of the sheet to simulate shoulders of the torso, said abdominal portion being formed with other corners which can be bent and curved rearwardly of the plane of the sheet to simulate hips of the torso, said sheet having angular slits extending inwardly from its edges and defining triangular portions which can be bent forwardly from the plane of the sheet to simulate breasts of the torso, the sheet having a rectangular portion extending below said abdominal portion, said rectangular portion having a T-slot defining rectangular flaps, lateral edges of said rectangular portion being continuous with said other corners of the abdominal portion, said flaps being foldable along vertical lines to extend out of the plane of the sheet to support the sheet in an upright position on a horizontal surface, said edges of the rectangular portion being bendable to form partially cylindrical parts for supplementing the support provided by said flaps.

2. A display form for a fabric display package, comprising a flat flexible sheet having a peripheral edge shaped to simulate the outline of a human torso, said sheet having shoulder, waist and abdominal portions, said shoulder portion being formed with corners which can be bent and curved rearwardly of the plane of the sheet to simulate shoulders of the torso, said abdominal portion being formed with other corners which can be bent and curved rearwardly of the plane of the sheet to simulate hips of the torso, said sheet having angular slits extending inwardly from its edges and defining triangular portions which can be bent forwardly from the plane of the sheet to simulate breasts of the torso, said sheet having a rectangular portion extending below said abdominal portion, said rectangular portion having a T-slot defining rectangular flaps, lateral edges of said rectangular portion being continuous with said other corners of the abdominal portion, said flaps being foldable along vertical lines to extend out of the plane of the sheet to support the sheet in an upright position on a horizontal surface, said edges of the rectangular portion being bendable to form partially cylindrical parts for supplementing the support provided by said flaps, said sheet being foldable on transverse spaced fold lines, a stiff strip rotatably secured to the rectangular portion, first fastener elements on the waist and abdominal portions, and fastener elements on the strip for detachably engaging the first elements while the strip extends across said transverse fold lines to hold the waist, abdominal and shoulder portions erect.

3. A display package for fabrics, comprising a flexible sheet having a peripheral edge shaped to simulate the outline of a human torso, said sheet having shoulder, waist and abdominal portions, said shoulder portion having corners bent and curved rearwardly to simulate shoulders of the torso, said abdominal portion being formed with other corners bent and curved rearwardly to simulate hips of the torso, said sheet having angular slits extending inwardly from its edges and defining triangular portions bent forwardly to simulate breasts of the torso, whereby said fabric assumes a three-dimensional configuration, said sheet having a rectangular portion extending below said abdominal portion, said rectangular portion having lateral edges continuous with said other corners and being bent and curved to form partially cylindrical parts for supporting the package in an upright position.

4. A display package for fabrics, comprising a flexible sheet having a peripheral edge shaped to simulate the outline of a human torso, said sheet having shoulder, waist and abdominal portions, said shoulder portion having corners bent and curved rearwardly to simulate shoulders of the torso, said abdominal portion being formed with other corners bent and curved rearwardly to simulate hips of the torso, said sheet having angular slits extending inwardly from its edges and defining triangular portions bent forwardly to simulate breasts of the torso, whereby said fabric assumes a three-dimensional configuration, said sheet having a rectangular portion extending below said abdominal portion, said rectangular portion having lateral edges continuous with said other corners and being bent and curved to form partially cylindrical parts for supporting the package in an upright position, said sheet being foldable on transverse spaced fold lines, a stiff strip rotatably secured to the rectangular portion, first fastener elements on the waist and abdominal portions, and other fastener elements on the strip for detachably engaging the first elements while the strip extends across said transverse fold lines to hold the waist, abdominal and shoulder portions erect.

5. A display package for fabrics, comprising a flexible sheet having a peripheral edge shaped to simulate the outline of a human torso, said sheet having shoulder, waist and abdominal portions, said shoulder portion having corners bent and curved rearwardly to simulate shoulders of the torso, said abdominal portion being formed with other corners bent and curved rearwardly to simulate hips of the torso, said sheet having angular slits extending inwardly from its edges and defining triangular portions bent forwardly to simulate breasts of the torso, whereby said fabric assumes a three-dimensional configuration, said sheet having a rectangular portion extending below said abdominal portion, said rectangular portion having lateral edges continuous with said other corners and being bent and curved to form partially cylindrical parts for supporting the package in an upright position, said sheet being foldable on transverse spaced fold lines, a stiff strip rotatably secured to the rectangular portion, first fastener elements on the waist and abdominal portions, and other fastener elements on the strip for detachably engaging the first elements while the strip extends across said transverse fold lines to hold the waist, abdominal and shoulder portions erect, said rectangular portion having a T-slot defining a pair of rectangular flaps, said flaps being bent away from the plane of the sheet to provide supplemental supports for holding the package erect on a horizontal surface.

References Cited in the file of this patent

UNITED STATES PATENTS

| | | |
|---|---|---|
| 962,915 | Posner | June 28, 1910 |
| 1,504,502 | Powell | Aug. 12, 1924 |
| 1,519,934 | Ross | Dec. 16, 1924 |
| 1,556,484 | Brandenburg | Oct. 6, 1925 |
| 1,617,676 | Dobbin | Feb. 15, 1927 |
| 1,663,573 | Tharp | Mar. 27, 1928 |
| 1,678,756 | Zimmerman | July 31, 1928 |
| 1,824,539 | Fitzpatrick | Sept. 22, 1931 |
| 2,384,495 | Shafarman | Sept. 11, 1945 |
| 2,702,148 | Paasche | Feb. 15, 1955 |
| 2,965,981 | Giovetti | Dec. 27, 1960 |
| 3,037,621 | Jackman | June 5, 1962 |